A. M. KENNEDY.
FENDER FOR MOTOR VEHICLES.
APPLICATION FILED MAY 4, 1915. RENEWED JUNE 15, 1916.
1,212,071.
Patented Jan. 9, 1917.
3 SHEETS—SHEET 1.
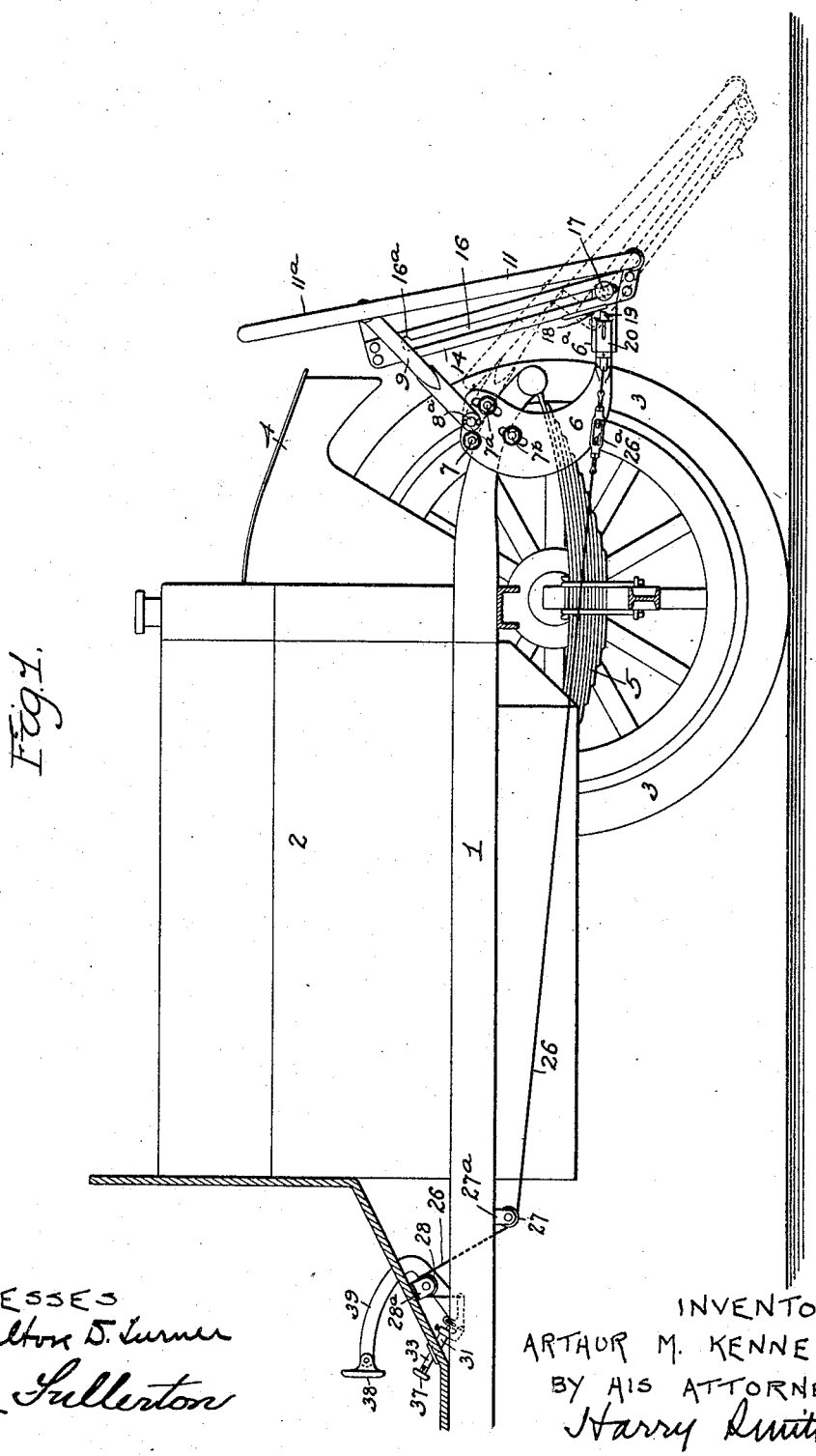
WITNESSES
INVENTOR
ARTHUR M. KENNEDY
BY HIS ATTORNEY
Harry Smith

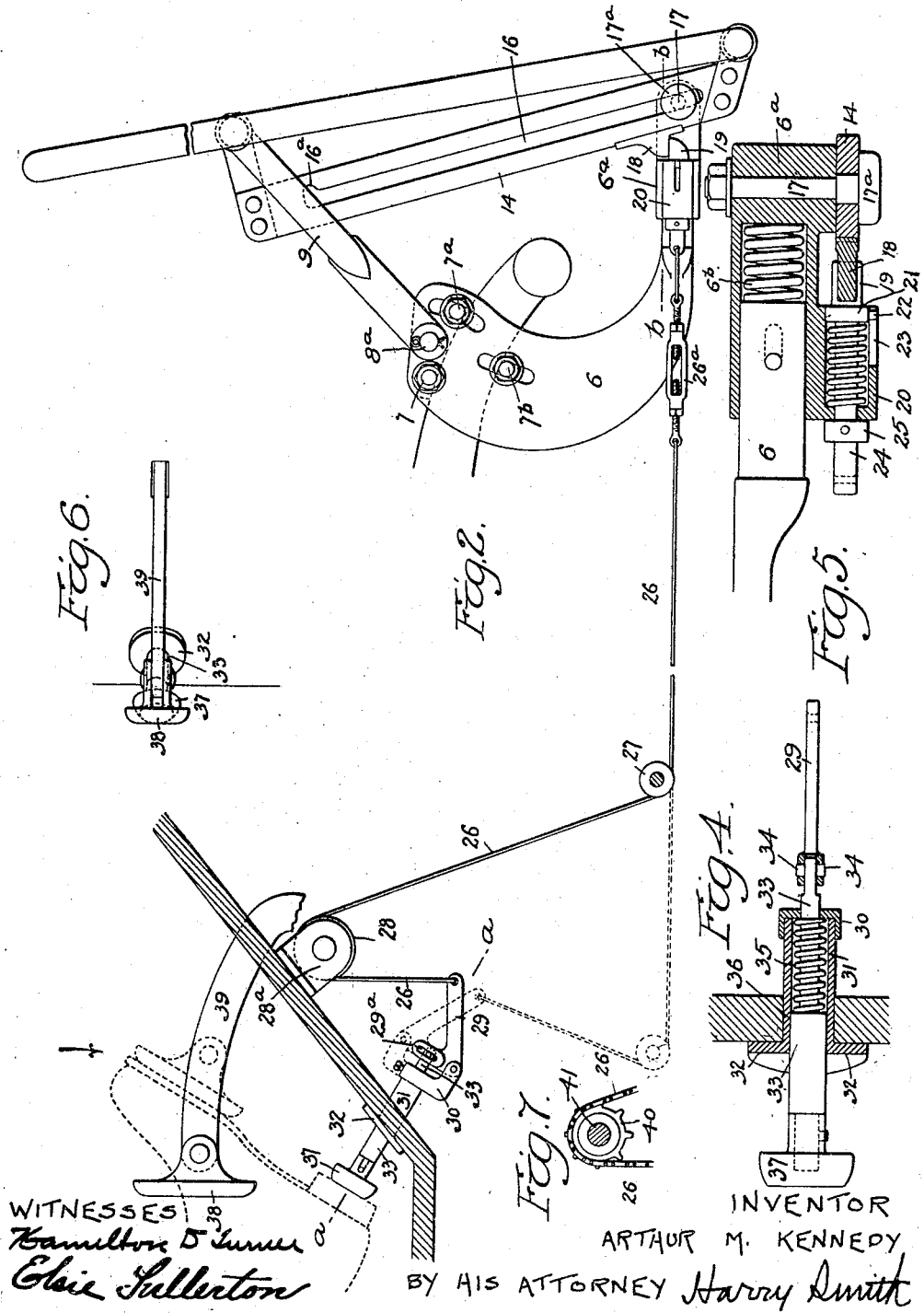

A. M. KENNEDY.
FENDER FOR MOTOR VEHICLES.
APPLICATION FILED MAY 4, 1915. RENEWED JUNE 15, 1916.
1,212,071.
Patented Jan. 9, 1917.
3 SHEETS—SHEET 3.
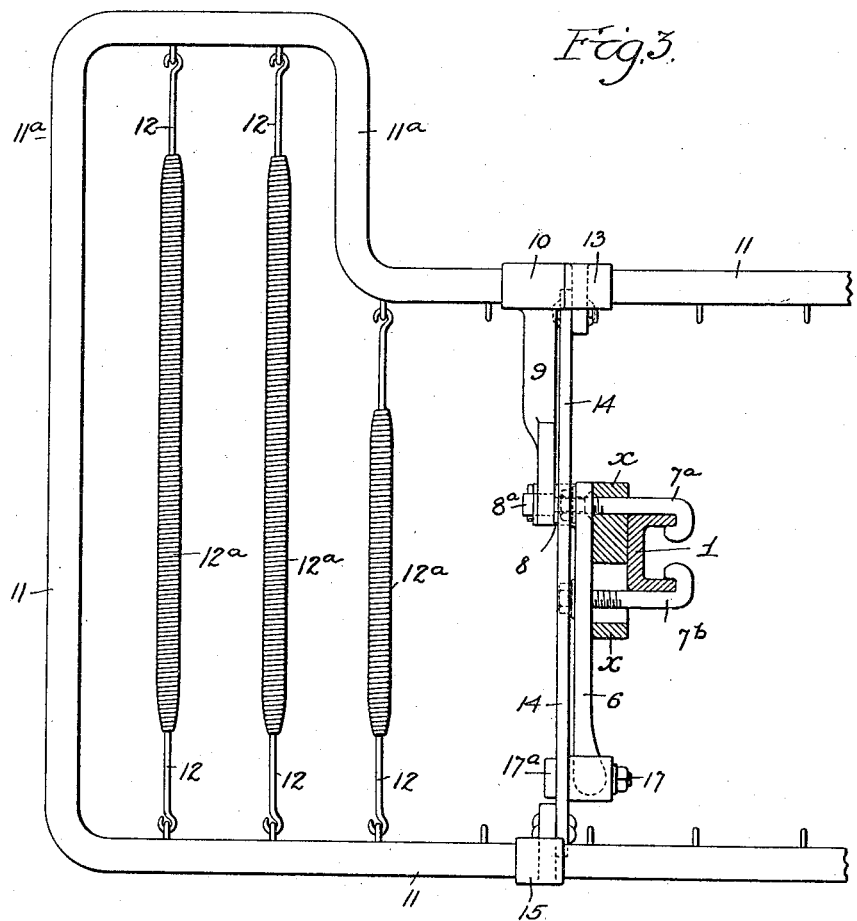
WITNESSES
Hamilton T. Turner
Elsie Fullerton
INVENTOR
ARTHUR M. KENNEDY
BY HIS ATTORNEY
Harry Smith

UNITED STATES PATENT OFFICE.

ARTHUR M. KENNEDY, OF PHILADELPHIA, PENNSYLVANIA.

FENDER FOR MOTOR-VEHICLES.

1,212,071.  Specification of Letters Patent.  Patented Jan. 9, 1917.

Application filed May 4, 1915, Serial No. 25,666.  Renewed June 15, 1916.  Serial No. 103,910.

*To all whom it may concern:*

Be it known that I, ARTHUR M. KENNEDY, a citizen of the United States, residing in Philadelphia, Pennsylvania, have invented certain Improvements in Fenders for Motor-Vehicles, of which the following is a specification.

My invention consists of a motor car fender of the drop type, the present invention comprising certain features of construction designed with the view of simplifying the structure, facilitating the dropping of the fender in case of emergency, and causing forward thrust of the lower portion of the fender as the same is lowered.

In the accompanying drawings Figure 1 is a view of the forward portion of a motor car provided with a fender constructed in accordance with my present invention, said fender being shown by full lines in the raised position and by dotted lines in the lowered position; Fig. 2 is a side elevation, on a larger scale than Fig. 1, of the fender and the means for mounting the same upon the fixed frame or chassis of the car and for retaining the same in the raised position or releasing it so as to permit it to drop; Fig. 3 is a view, partly in front elevation and partly in section, of one end of the fender and of the mounting devices therefor; Fig. 4 is a view, partly in plan and partly in section, on the line $a$—$a$, Fig. 2, and on a larger scale than said figure; Fig. 5 is a view, partly in plan and partly in section, on the line $b$—$b$, Fig. 2, and on a larger scale than said figure; Fig. 6 is a view of the brake-applying and fender releasing devices looking in the direction of the arrow Fig. 2, and Fig. 7 is a sectional view illustrating means which may be employed when it is desired to effect the simultaneous retraction of fender releasing devices on opposite sides of the car.

In Figs. 1, 2 and 3 of the drawings, I have shown but one end of the fender with the supporting and releasing devices therefor upon one of the side bars of the frame but it should be understood that the fender extends across the front of the car and has supporting devices at each side of the same.

In Fig. 1 of the drawing, 1 represents part of one of the side members of the car frame, 2 the engine hood, 3 one of the front wheels, 4 the wheel guard acting in conjunction therewith, and 5 one of the supporting springs for the front axle, all of these parts being of ordinary construction and forming no part of my invention. Secured to the projecting forward end of the bar 1 is a plate 6 upon which the fender is mounted, this plate being secured to the side bar 1 of the frame by means of clamp bolts 7, $7^a$ and $7^b$ (see Figs. 1 and 3) and being provided with a projecting stud 8, as shown in Fig. 3. Passing through or projecting from this stud is a pin $8^a$ on which is pivotally mounted the lower end of an arm 9 whose upper end carries the upper portion of the fender, as hereinafter explained. Between the plate 6 and the bar 1 is interposed a block $x$ (Fig. 3) which provides a bearing for said plate 6, although this block is not absolutely necessary and may be omitted if desired. The bolts 7, $7^a$ and $7^b$ pass through this block and through the plate 6, said plate being preferably provided with slots for the reception of the bolts $7^a$ and $7^b$ so as to permit adjustment of the plate in respect to the bolt 7, or adjustment of the bolts $7^a$ and $7^b$ in respect to the bar 1, as may be desired. The arm 9 has at its upper end a sleeve 10 which embraces the upper member of the rectangular fender frame 11, the latter having at each end an upwardly extending wing $11^a$ in front of and in line with the wheel guard on that side of the car.

The fender frame is provided with a structure for receiving and supporting any object which may come into contact therewith. This structure may consist of any desirable form of screen or net work but it is preferably composed of wires 12 connected to the top and bottom bars of the frame, and disposed side by side throughout the length of the same, the central portion of each wire being coiled so as to form a spring member $12^a$ and thereby impart the desired resiliency to the wire. In Fig. 3 I have shown only the outermost of these wires in order not to interfere with the proper showing of the supporting devices for the fender.

The upper bar of the fender frame is also engaged by a sleeve 13 mounted upon the upper end of a bar 14 whose lower end also engages at 15 the lower bar of the fender frame, as shown in Fig. 3, said fender frame being thereby mounted upon the bar 14 so as to partake of the rising and falling movements of the latter. The bar 14 has a slot 16 extending almost from end to end of the same and through this slot passes a bolt 17 carried by a sliding block $6^a$ mounted upon the forwardly projecting end of the plate 6, the head 17ª of said bolt bearing against the outer face of the bar 14 and serving to confine the same laterally to the block 6ª while not interfering with the free rising and falling movement of the bar in respect thereto.

Between the forward end of the plate 6 and the base of the opening formed in the block 6ª for the reception of said forward end of the plate is interposed a spring 6ᵇ (Fig. 5) so that when the lower portion of the fender strikes an obstruction it can move backwardly to a slight extent, determined by the compression of the spring 6ᵇ which thus acts as a shock absorber for the fender.

When the fender is in the elevated position shown in Fig. 2 and by full lines in Fig. 1, a lug 18 on the rear face of the bar 14 engages a bolt 19 guided in a casing 20 secured to or forming part of the outer face of the block 6ª but when this bolt is retracted the fender drops from the elevated position shown by full lines in Fig. 1 to the lowered position shown by dotted lines in said figure, the bolt 17 being then in position to engage a notch 16ª on the forward side of the slot 16 so as to retain the fender in the lowered position, a slight forward movement of the upper end of the bar 14 preceding the lifting movement when it is desired to again raise the fender from the lowered to the raised position.

The guide bolt 17 for the bar 14 bears such relation to the pivot pin 8ª of the arm 9 that as the fender moves downwardly its lower portion will be thrust forwardly, as shown by dotted lines in Fig. 1, so that when the lowered fender strikes a body in front of the car its tendency will be to direct said body onto the elastic supporting members 12, 12ª of the fender instead of pushing or rolling it in front of the fender.

Immediately in the rear of the bolt 19 is a flange 21 (Fig. 5) which can move freely forwardly and backwardly in the casing 20 and has a lug 22 projecting into a slot 23 in the outer part of said casing, whereby the bolt 19 is prevented from turning on its axis so as to carry the upper face of the bolt out of position for engaging the lower face of the lug 18. The contracted stem 24 of the bolt 19 passes through an opening in the rear end of the casing 20 and has secured thereto a collar 25 which limits the extent of projection of the bolt 19.

To the rear end of the bolt stem 24 is connected the forward end of a cord, wire, chain, or equivalent flexible connection 26 (hereinafter, for convenience, referred to as a "chain"). This chain passes around a pulley 27 mounted so as to be free to turn on a spindle carried by a bracket 27ª on the bar 1 and thence around a pulley 28 free to turn on a spindle which is mounted in a bracket 28ª secured to the under portion of the body of the car, the rear end of the chain being connected to one arm of a bell crank lever 29 which is pivotally mounted in a bracket 30 mounted upon a tubular structure 31, the latter being provided with a securing plate 32 fastened to the body of the car, as shown in Figs. 1 and 2. The other arm of the bell crank lever 29 is slotted, as shown at 29ª in Fig. 2, and embraces the outer end of a plunger 33 (Fig. 4) mounted so as to move forwardly and backwardly in the tubular structure 31 and having at its forward end a pin 34 for engaging the slotted arm of the lever 29, the plunger 33 being normally retained in its retracted position by means of a spring 35 surrounding the plunger within the tubular structure 31 and bearing at its forward end against the forward end of the structure 30, and at its rear end against the thickened rear end of the plunger 33, as shown in Fig. 4, or against a suitable collar on said plunger.

The inner and upper end of the plunger 33 is provided with a pedal 37 intended to be acted upon by the heel of the same foot whose sole acts upon the pedal 38 at the upper end of the brake-operating lever 39, a portion only of the latter being shown in the drawing, as it differs in no respect from brake-operating levers heretofore employed. The pedal 37 is disposed below the pedal 38 and the face of said pedal 37 is in a different angular plane from that of the pedal 38 for a purpose hereinafter described.

In the ordinary running of the car the parts occupy the position shown by full lines in Fig. 2. In case there is danger of collision with any object on the road in front of the car the foot acts upon both pedals 37 and 38, hence when the pedal 38 is pressed forwardly by the sole of the foot so as to apply the brake, as shown by dotted lines in Fig. 2, the foot is brought into such position that the heel is parallel with the pedal 37, consequently continued forward movement of the foot projects the plunger 33, withdraws the bolt 19 and permits the fender to drop.

The bracket 30 is mounted upon the plunger casing 31 so that it can be rotated thereon in order that forward movement of the plunger 33 may cause the lever 29 to pull downwardly upon the chain 26, as shown by full lines in Fig. 2, upwardly upon said chain, as shown by dotted lines in said figure, or sidewise in either direction, the disposition of the bracket 30 and lever 29 depending upon the course taken by the chain which may be modified to suit the different types of cars to which the fender is applied. The chain is also, by preference, provided with a turn buckle 26ª, as shown in Fig. 2, for the purpose of taking up any slack in the chain and insuring the withdrawal of the supporting bolt 19 whenever the plunger 33 is pressed forwardly.

In most cases it will only be necessary to equip the plate 6 at one side of the machine with the bolt 19 for supporting the fender in the elevated position but if it is desired to employ a supporting bolt at each end of the fender and to withdraw them simultaneously by operating a single pedal 37, this can readily be effected by using a sprocket wheel 40, as shown in Fig. 7, for engagement with the transmitting chain 26, said sprocket wheel being secured to a shaft 41 which extends across the front of the car body and has at its opposite end a drum connected to the chain which actuates the supporting bolt 19 at that side of the machine, movement of the chain 26 being thus transmitted through the medium of the sprocket wheel 40 to the shaft 41, and thence to the chain operating drum at the opposite side of the machine.

I claim:

1. The combination, in a fender for motor cars, of a side plate mounted on the frame of the car, a slotted bar, a fender frame carried thereby, a fixed lower guide for said slotted bar, and a swinging arm upon which the upper portion of the bar is mounted.

2. The combination, in a fender for motor cars, of a fixed structure, a fender structure which can rise and fall in respect to said fixed structure, a pivot pin on which said fender structure can, as it drops, swing so as to forwardly project its lower end, a slotted member for receiving said pivot pin, and means whereby, as the fender structure drops, its lower end will be projected forwardly.

3. The combination, in a fender for motor cars, of a side plate mounted on the frame of the car, a slotted bar, a fender frame carried thereby, a fixed lower guide for said slotted bar, and a swinging arm upon which the upper portion of the bar is mounted, said slotted bar having near the upper end of the slot a notch for engaging the lower guide and retaining the fender in its lowered position.

4. The combination, in a fender for motor cars, of a fender frame having at each end a wing projecting upwardly beyond the intervening portion and in line with the wheel guard on that side of the car, the space between said wings and above the top bar of the intervening portion of the fender being unobstructed.

5. The combination, in a fender for motor cars, of a fender frame normally occupying a substantially upright position in advance of the front wheels, and having at each end a wing projecting upwardly beyond the intervening portion and in line with the wheel guard on that side of the car, the space between said wings and above the top bar of the intervening portion of the fender being unobstructed, and means for retaining said fender in elevated position or releasing the same so as to permit it to drop.

6. The combination, in a fender for motor cars, of a member fixedly mounted upon the frame of the car, a fender structure having a supporting lug thereon, a spring bolt engaging said supporting lug, a plunger mounted on the body of the car, and a flexible connection between said plunger and the spring bolt.

7. The combination, in a fender for motor cars, of a vertically movable fender structure having a supporting lug thereon, a spring bolt engaging said supporting lug, a plunger mounted on the body of the car, a lever in operative connection with said plunger, and a flexible connection between said lever and said spring bolt.

8. The combination, in a fender for motor cars, of a member fixedly mounted upon the frame of the car, a member movable backwardly and forwardly on said fixed member, a spring normally tending to project said movable member, and a fender structure connected to said movable member whereby the latter will act as a shock absorber for said fender.

9. The combination, in a fender for motor cars, of a member fixedly mounted upon the frame of the car, a member movably mounted on said fixed member, a spring for projecting said movable member, a fender having a slotted bar, a guide for said slotted bar on said movable member, and means for retaining the fender in raised position or releasing it so as to permit it to drop.

10. The combination, in a fender for motor cars, of a member fixedly mounted upon the frame of the car, a member movably mounted on said fixed member, a spring for projecting said movable member, a movable fender, a guide therefor carried by said movable member, and a bolt also carried by said movable member and serving to retain the fender in its raised position or release it so as to permit it to drop.

11. In a fender for motor cars, the combination of a fixed side bar of the car frame projecting forwardly in advance of the front axle, a fender-carrying plate mounted upon said forwardly projecting side frame of the car, and clamp bolts above and below said fixed side bar of the frame for securing the fender-carrying plate thereto.

12. In a fender for motor cars, the combination of a fixed side bar of the car frame, a fender carrying-plate mounted thereon, and clamp bolts above and below said fixed bar of the frame for securing the fender-carrying plate thereto, some of said bolts being adapted to slots in the fender-carrying plate so as to permit adjustment of the plate in respect to the bolts, or of the bolts in respect to the frame bar.

13. The combination of a motor car fender, a tripping device therefor, a brake-actuating arm, and pedals on said arm and tripping device, both of said pedals being adapted to be actuated by one and the same foot but when they are in retracted position presenting faces in different angular planes.

14. The combination of a movable fender structure, means for retaining the same in an elevated position, said means comprising a movable bolt, a lever, a flexible connection between them, and a lever-carrying bracket mounted so as to be adjustable to different positions in order to change the direction of pull of the lever.

In testimony whereof, I have signed my name to this specification, in the presence of two subscribing witnesses.

ARTHUR M. KENNEDY.

Witnesses:
KATE A. BEADLE,
HAMILTON D. TURNER.

Copies of this patent may be obtained for five cents each, by addressing the "Commissioner of Patents, Washington, D. C."